(12) United States Patent
Lvovsky et al.

(10) Patent No.: US 9,081,604 B2
(45) Date of Patent: Jul. 14, 2015

(54) AUTOMATIC DISCOVERY OF EXTERNALLY ADDED DEVICES

(71) Applicant: Red Hat Israel, Ltd., Raanana (IL)

(72) Inventors: Igor Lvovsky, Raanana (IL); Eduardo Warszawski, Kfar Saba (IL)

(73) Assignee: Red Hat Israel, Ltd., Raanana (IL)

( * ) Notice: Subject to any disclaimer, the term of this patent is extended or adjusted under 35 U.S.C. 154(b) by 245 days.

(21) Appl. No.: 13/725,887

(22) Filed: Dec. 21, 2012

(65) Prior Publication Data

US 2014/0181810 A1    Jun. 26, 2014

(51) Int. Cl.
*G06F 9/455* (2006.01)
*G06F 3/00* (2006.01)
*G06F 9/445* (2006.01)

(52) U.S. Cl.
CPC ........ *G06F 9/45558* (2013.01); *G06F 9/44505* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 8,566,492 B2* | 10/2013 | Madukkarumukumana et al. | 710/260 |
| 8,910,152 B1* | 12/2014 | Hyser et al. | 718/1 |
| 2003/0056051 A1* | 3/2003 | Burke et al. | 710/302 |
| 2004/0249907 A1* | 12/2004 | Brubacher et al. | 709/220 |
| 2004/0255067 A1* | 12/2004 | Wolford | 710/302 |
| 2006/0064523 A1* | 3/2006 | Moriki et al. | 710/62 |
| 2008/0276258 A1* | 11/2008 | Liu et al. | 719/327 |
| 2009/0164990 A1* | 6/2009 | Ben-Yehuda et al. | 718/1 |
| 2011/0066786 A1* | 3/2011 | Colbert | 711/6 |
| 2011/0145815 A1* | 6/2011 | Zou et al. | 718/1 |
| 2011/0238820 A1* | 9/2011 | Matsuoka | 709/224 |
| 2012/0036306 A1* | 2/2012 | Miyoshi | 710/316 |
| 2012/0102252 A1* | 4/2012 | Tsirkin | 710/302 |
| 2012/0246644 A1* | 9/2012 | Hattori et al. | 718/1 |
| 2012/0304170 A1* | 11/2012 | Morgan | 718/1 |
| 2013/0024856 A1* | 1/2013 | Yusupov | 718/1 |
| 2013/0080542 A1* | 3/2013 | Peng et al. | 709/206 |
| 2013/0124712 A1* | 5/2013 | Parker | 709/224 |
| 2013/0138854 A1* | 5/2013 | Bandholz et al. | 710/302 |
| 2013/0155083 A1* | 6/2013 | McKenzie et al. | 345/522 |
| 2013/0275969 A1* | 10/2013 | Dimitrov | 718/1 |
| 2013/0278964 A1* | 10/2013 | Zeng et al. | 358/1.15 |
| 2013/0305242 A1* | 11/2013 | Wang et al. | 718/1 |
| 2013/0318521 A1* | 11/2013 | Monaghan et al. | 718/1 |
| 2014/0032920 A1* | 1/2014 | Gehrmann et al. | 713/176 |
| 2014/0068606 A1* | 3/2014 | Tsirkin et al. | 718/1 |
| 2014/0068607 A1* | 3/2014 | Tsirkin et al. | 718/1 |

\* cited by examiner

*Primary Examiner* — Adam Lee
(74) *Attorney, Agent, or Firm* — Lowenstein Sandler LLP (57) ABSTRACT

An exemplary system may automatically discovery externally added devices. In one embodiment, the system obtains initial device information for a virtual machine running on a host computing system. The system determines whether an external event occurred on the host computing system. A management computing system associated with the host computing system does not receive notification of the external event. Upon determining that the external event occurred on the host computing system, the system obtains updated device information for the virtual machine running on the host computing system.

18 Claims, 5 Drawing Sheets

AUTOMATIC DISCOVERY OF EXTERNALLY ADDED DEVICES

TECHNICAL FIELD

Embodiments of the present disclosure relate to adding external devices to a computing system, and more particularly, to a technique for automatic discovery of externally added devices.

BACKGROUND

A management computing system can manage one or more host computing systems, and can instruct a host computing system to add a virtual machine on the host computing system using a general configuration. When an external event occurs via the management computing system, such as in response to an external device being added to or removed from a host computing system via the management system, the management system can decide whether the configuration of virtual machines running on the host management system should be updated based on the external event.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Embodiments of the disclosure are directed to a method and system for automatic discovery of externally added devices.

A management computing system can instruct a host computing system to add a virtual machine with a general configuration. The general configuration can include one or more devices to associate with the virtual machine such that the virtual machine can use the one or more devices. For example, the management computing system can instruct the host computing system to associate a network controller with the virtual machine and the virtual machine will then be able to use the network controller. The management computing system may not provide additional information to the host computing system about the configuration for the virtual machine. For example, the management computing system may not identify which network controller to use. The host computing system can identify one or more devices for the virtual machine based on the general configuration. For example, the host computing system can add a virtual machine A that will use network controller B.

When an external event occurs via the management computing system, such as an external device being added to or removed from a host computing system via the management system, the management system can decide whether the configuration of virtual machines running on the host management system should be updated based on the external event. However, if the external event occurs via a virtual machine running on the host computing system or via the host computing system, the management computing system is not aware of the external event, and therefore cannot determine whether the configuration of the virtual machines running on the host management system should be updated. Moreover, if a virtual machine running on a host computing system fails, the management computing system is not aware of the devices that were actually used by the virtual machine before the virtual machine failed. If the management computing system wants to recreate or reboot the virtual machine, the management computing system cannot ensure that the virtual machine uses the same devices as were previously used.

Embodiments of the present application automatically discover externally added devices and provide the run-time device information to the management computing system. Therefore, if an external event occurs via the host computing system or via a virtual machine running on the host computing system rather than the management computing system, the management computing system has specific device information for the externally added device, and can determine whether to update the configuration of virtual machines running on the host computing system. Moreover, if a virtual machine running on a host computing system fails, the management computing system has specific device information for the virtual machine, and can recreate the virtual machine using the specific device information. This can ensure that the virtual machine uses the same devices previously used, thus providing a stable environment for users (e.g., applications) of the virtual machine.

Figure 1:
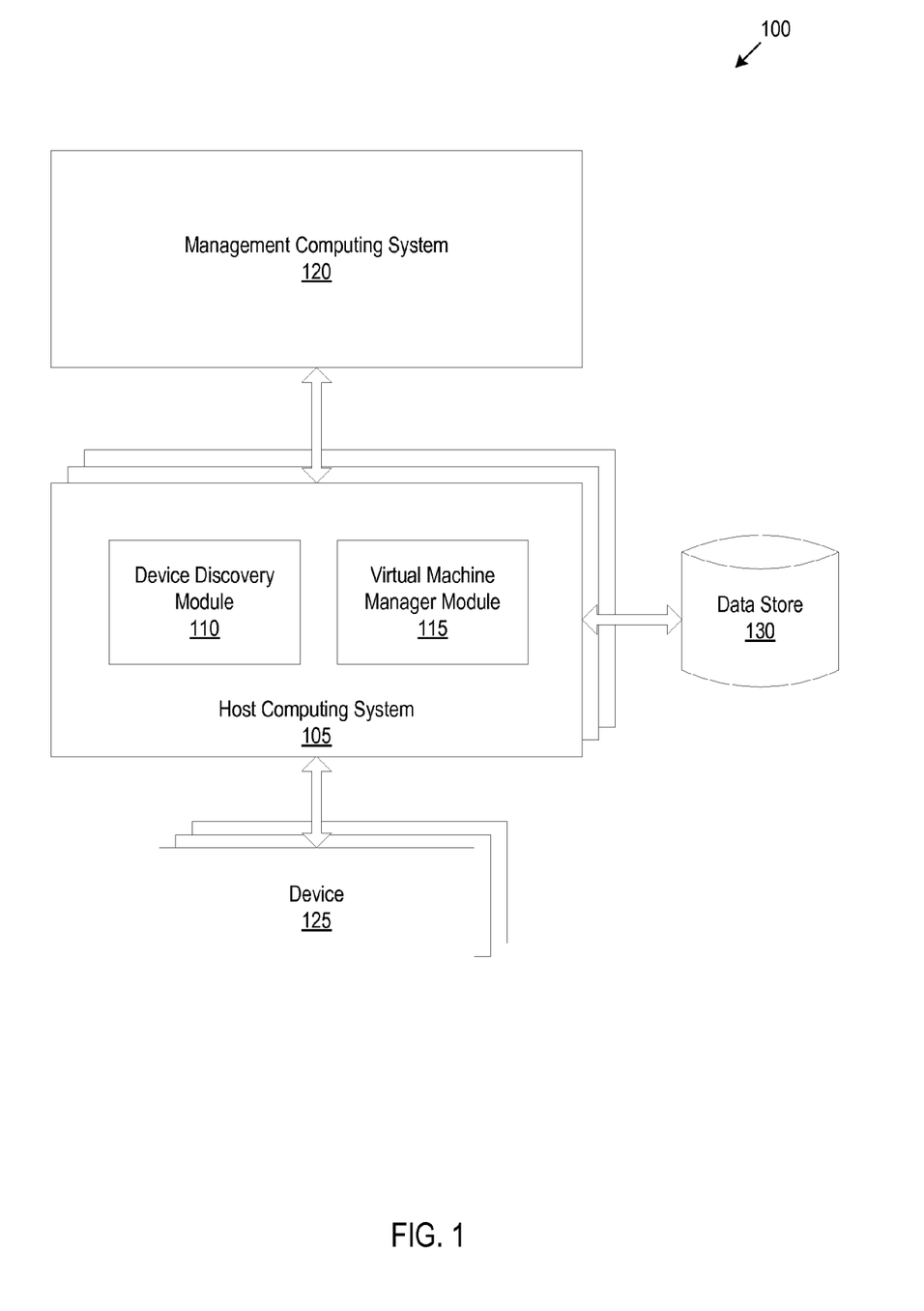
FIG. 1 illustrates exemplary system architecture, in accordance with various embodiments of the present disclosure.

FIG. 1 illustrates an exemplary system architecture 100 in which embodiments can be implemented. The system architecture 100 includes host computing systems 105, a management computing system 120, one or more devices 125, and a data store 130. The host computing system 105, the management computing system 120, the one or more devices 125, and the data store 130 can communicate and be connected by a network (not shown).

Examples of host computing system 105 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices. The host computer system 105 may include a hypervisor and one or more virtual machines running on top of the hypervisor.

Examples of management computing system 120 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices.

Device 125 can represent one or more devices that can be associated with a host computing system 105. The device 125 can be any device that can be connected to a host computing system and that can be used by one or more virtual machines running on the host computing system, such as a physical hardware device, a virtual hardware device, etc. For example, the device 125 can be a virtual disk, a virtual network controller, a virtual network card, a physical disk, a physical network controller, a physical network card, etc.

Data store 130 can reside on one or more writable persistent storage devices, such as memories, tapes or disks. In one embodiment, the one or more writable persistent storage devices are non-Random Access Memory (RAM) devices. Although each of host computing system 105 and data store 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

The data in the data store 130 can include data related to the host computing system 105. Examples of data related to the host computing system 105 can include, and are not limited to, device information for virtual machines running on the host computing system 105, and any other electronically stored information that can be associated with a system, etc.

During operation of the system architecture 100, the host computing system 105 can add one or more virtual machines to run on the host computing system 105 based on a request received from the management computing system 120. In one embodiment, the host computing system 105 can include a device discovery module 110 and a virtual machine manager 115 that can be part of the hypervisor or run on top of the hypervisor.

The device discovery module 110 can obtain initial device information for a virtual machine running on the host computing system 105. The device information for the virtual machine can include an identifier for each device 125 used by the virtual machine running on the host computing system 105. The device discovery module 110 can save the device information for the virtual machine in storage, such as data store 130. The device discovery module 110 can determine whether a report should be generated for the virtual machine based on a request, a policy, etc. The report can include a portion of the device information for the virtual machine running on the host computing system 105. If the device discovery module 110 determines that a report should be generated, the device discovery module 110 can generate the report to include at least a portion of the device information obtained for the virtual machine. The device discovery module 110 can store the report in storage, such as data store 130. In one embodiment, upon generating the report for the virtual machine running on the host computing system 105, the device discovery module 110 can provide (e.g., send) the report to the management computing system 120.

The device discovery module 110 can determine whether an external event occurred. An external event can occur when a device 125 is added to (e.g., hot-plugged) a virtual machine running on the host computing system 105, when a device 125 is removed from (e.g., hot-unplugged) a virtual machine running on the host computing system 105, when a device 125 is added to (e.g., hot-plugged) a host computing system 105, when a device 125 is removed from (e.g., hot-unplugged) the host computing system 105, etc. In one embodiment, the device discovery module 110 determines that an external event occurred by receiving a notification from the device 125 that caused the external event. In an alternate embodiment, the device discovery module 110 determines that an external event occurred by receiving a notification from the virtual machine, the hypervisor or another component of host computing system 105. In one embodiment, the management computing system 120 does not receive notification of the external event and is unaware that an external event occurred. Upon determining that an external event occurred, the device discovery module 110 can obtain the updated device information for the virtual machine and can provide the updated device information to the management computing system 120. In one embodiment, the device discovery module 110 can store the updated device information in storage, such as data store 130.

The device discovery module 110 can obtain the device information for all virtual machines running on the host computing system 105.

In one embodiment, the virtual machine manager module 115 receives a request to add a virtual machine. If the request includes specific information, such as specific device information based on device information obtained by the device discovery module 110, for the virtual machine, the virtual machine manager module 115 can add the virtual machine using the specific devices included in the specific information. If the request does not include specific information for the virtual machine, the virtual machine manager module 115 can add the virtual machine using a general configuration.

Figure 2:
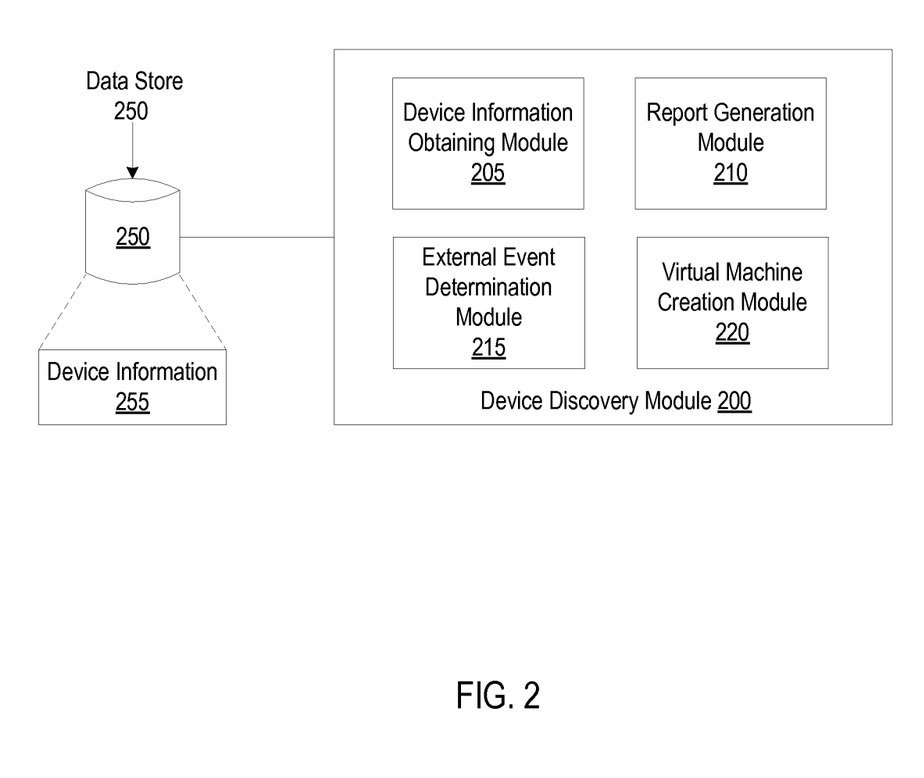
FIG. 2 is a block diagram of a device discovery module, in accordance with an embodiment.

FIG. 2 is a block diagram of a device discovery module 200, in accordance with one embodiment of the present disclosure. The device discovery module 200 includes a device information obtaining module 205, a report generation module 210, an external event determination module 215, and a virtual machine creation module 220. Note that in alternative embodiments, the functionality of one or more of the device information obtaining module 205, the report generation module 210, the external event determination module 215, and the virtual machine creation module 220 may be combined or divided.

The device information obtaining module 205 can obtain device information for a virtual machine running on a host computing system. The device information for the virtual machine can include an identifier for each device used by the virtual machine, such as a name, an address (e.g., PCI address), a serial number, etc. The device information obtaining module 205 can obtain the device information for a virtual machine periodically, in response to a request for the device information, in response to an external event, etc. The device information obtaining module 205 can store the device in a memory, such as device information 255 of data store 250. Upon obtaining the device information for the virtual machine, the device information obtaining module 205 can provide the information to report generation module 210.

The report generation module 210 can determine whether a report should be generated for the virtual machine using the device information. The report generation module 210 can determine whether a report should be generated based on whether a request was received, based on a policy, based on the occurrence of an external event, etc. If the report generation module 210 determines that a report should be generated for the virtual machine, the report generation module 210 can generate the report for the virtual machine. In one embodiment, the report generation module 210 can include a portion of the device information or all of the device information in the report. In one embodiment, the report generation module 210 provides the report for the virtual machine to a management computing system (not shown). In one embodiment, the report generation module 210 can store the report in a data store, such as data store 250.

The external event determination module 215 can determine whether an external event occurred. The external event determination module 215 can determine that an external event occurred when a device is added to (e.g., hot-plugged)

a virtual machine running on a host computing system, when a device is removed from (e.g., hot-unplugged) a virtual machine running on a host computing system, when a device is added to (e.g., hot-plugged) a host computing system, when a device is removed from (e.g., hot-unplugged) a host computing system, etc. The external event determination module 215 can determine whether the external event occurred by receiving notification of the external event, by sending a request of the external event, etc. If the external event determination module 215 determines that an external event occurred, the external event determination module 215 can send a notification of the external event to the device information obtaining module 205 for the device information to be obtained.

The virtual machine creation module 220 can add or create a virtual machine in response to receiving a request to add the virtual machine. The virtual machine creation module 220 can determine whether the request to add or create the virtual machine includes specific information for the virtual machine, such as one or more specific devices (e.g., a PCI address of a device) to associate with the virtual machine. If the virtual machine creation module 220 determines that the request includes specific information for the virtual machine, the virtual machine creation module 220 uses the specific information and a general configuration to add or create the virtual machine. If the virtual machine creation module 220 determines that the request does not include specific information for the virtual machine, the virtual machine creation module 220 uses only the general configuration to add or create the virtual machine.

Figure 3:
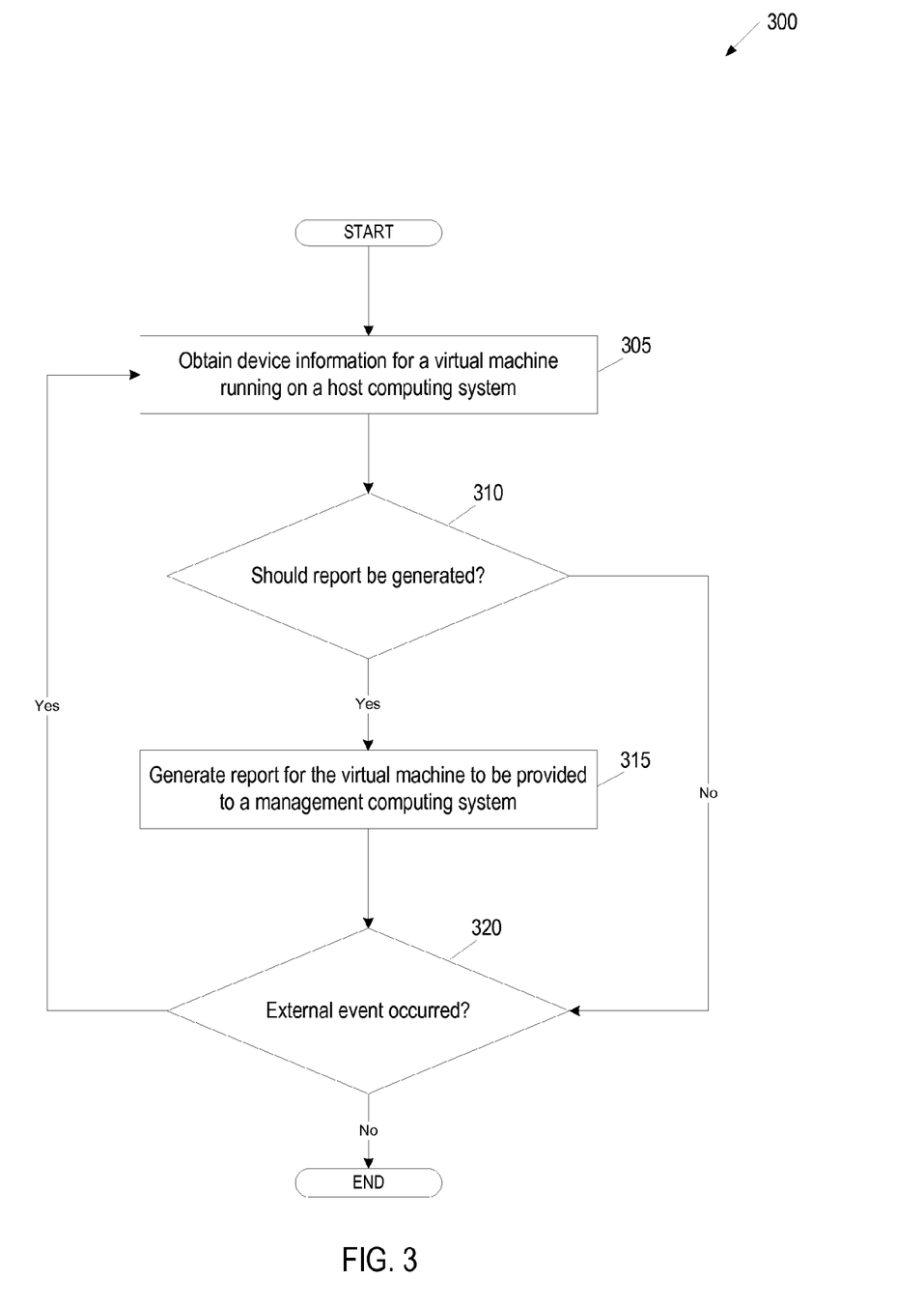
FIG. 3 is a flow diagram illustrating an embodiment for a method of automatically discovering externally added devices, in accordance with an embodiment.

FIG. 3 is a flow diagram of an embodiment of a method 300 for method of automatically discovering externally added devices. The method 300 is performed by processing logic that may comprise hardware (circuitry, dedicated logic, etc.), software (such as is run on a general purpose computer system or a dedicated machine), or a combination of both. In one embodiment, the method 300 is performed by the device discovery module 200 of FIG. 2.

At block 305, processing logic obtains initial device information for a virtual machine running on a host computing system. The device information for the virtual machine can include an identifier for each device used by the virtual machine. In one embodiment, the identifier for a device includes a Peripheral Component Interconnect (PCI) address of the device used by the virtual machine. The PCI address of each device can depend on the hardware slot used by the device in the virtual machine. For example, a virtual network card is in slot A of the virtual machine and the PCI address of slot A is 123. In this example, the device information for the virtual machine will include the identifier 123 for the virtual network card. In an alternate embodiment, the identifier for each device used by the virtual machine is a Media Access Control (MAC) address of the device. In another alternate embodiment, the identifier for each device used by the virtual machine is a Ethernet Hardware Address (EHA). In yet another alternate embodiment, the identifier for each device used by the virtual machine is an alias of the device. The device information can further include additional information from the device, such as a type of the device, a manufacturer of the device, any special information for the device, etc.

In one embodiment, processing logic can obtain the device information for the virtual device periodically (e.g., once a day, once a week, etc.). In an alternate embodiment, processing logic can obtain the device information for the virtual device in response to a request for the information, such as from another computing system. In another alternate embodiment, processing logic can obtain the device information in response to an external event, described in more detail below.

In one embodiment, processing logic obtains the device information for the virtual machine by sending a request for the device information to the virtual machine. In an alternate embodiment, processing logic obtains the device information for the virtual machine by obtaining the device information from the process on the host computing system running the virtual machine. In another embodiment, processing logic obtains the device information for the virtual machine by accessing the device information in a storage system to which the virtual machine stores the device information.

At block 310, processing logic determines whether a report should be generated. In one embodiment, processing logic determines that a report should be generated when a request for a report is received. The request for the report can be received from a virtual machine, from a host computing system, from a management computing system, from an administrator, etc. In an alternate embodiment, processing logic determines whether a report should be generated based on a policy. The policy can be defined by an administrator, by the host computing system, by the management computing system, etc. The policy can be defined for the virtual machine, for the host computing system, for the management computing system, etc. The policy can define when a report should be generated for a virtual machine. In one embodiment, the policy defines that a report should be generated periodically (e.g. every hour, every day, etc.). In an alternate embodiment, the policy defines that a report should be generated upon determining that the device information obtained for the virtual machine is different than device information previously obtained for the virtual machine. In one embodiment, processing logic determines whether the device information obtained for the virtual machine is different than device information previously obtained for the virtual machine by accessing the device information previously obtained (e.g., from a storage system) and comparing the device information previously obtained to the device information currently obtained for the virtual machine. If the device information is not different, meaning that the device information for the virtual machine has not changed since it was last obtained, the method 300 proceeds to block 320. If the device information is different, meaning that the device information for the virtual machine has changed since it was last obtained, the method 300 proceeds to block 315. In some embodiments, if the device information is different, processing logic stores the device information for the virtual machine prior to proceeding to block 315. In one such embodiment, processing logic stores all the device information for the virtual machine. In an alternate such embodiment, processing logic performs an incremental store, only storing the differences between the currently obtained device information and the device information previously obtained.

At block 315, processing logic generates a report for the virtual machine to be provided to a management computing system. In one embodiment, processing logic generates the report for the virtual machine by copying or including all of the device information currently obtained for the virtual machine in the report. In an alternate embodiment, processing logic generates the report for the virtual machine by determining the incremental changes between the device information previously obtained and the currently obtained device information, and copying or including the incremental changes in the report. The previously obtained device information can be based on a report that was previously generated for the virtual machine or can be based on previously obtained device information stored for the virtual machine in a data store.

In one embodiment, processing logic provides the report for the virtual machine to a management computing system by sending the report to the management computing system over a connection (e.g., network, bus, etc.). In an alternate embodiment, processing logic provides the report for the virtual machine to the management computing system by storing the report in a predefined storage location accessible to the management computing system (e.g., data store, shared memory, etc.).

At block 320, processing logic determines whether an external event occurred. In one embodiment, an external event occurs when a device is added to (e.g., hot-plugged) a virtual machine running on a host computing system. In an alternate embodiment, an external event occurs when a device is removed from (e.g., hot-unplugged) a virtual machine running on a host computing system. In another embodiment, an external event occurs when a device is added to (e.g., hot-plugged) a host computing system and a management computing system associated with the host computing system does not receive notification of the device being added to the host computing system. In yet another embodiment, the external event occurs when a device is removed from (e.g., hot-unplugged) a host computing system and a management computing system associated with the host computing system does not receive notification of the device being removed from the host computing system. In another alternate embodiment, the external event occurs when a device is added to a management computing system. In yet another alternate embodiment, the external event occurs when a device is removed from a management computing system. In one embodiment, processing logic determines whether an external event occurred on a periodic basis (e.g., every hour, every day, etc.). In an alternate embodiment, processing logic determines whether an external event occurred upon receiving notification of the external event, such as from the host computing system, from the virtual machine running on the host computing system, etc.

In one embodiment, processing logic determines whether an external event occurred by receiving notification of the external event from the virtual machine running on the host computing system. In another embodiment, processing logic determines whether an external event occurred by sending a request to the virtual machine running on the host computing system asking whether an external event occurred. In an alternate embodiment, processing logic determines whether an external event occurred by receiving a notification of the external event from the process running the virtual machine on the host computing system. In another alternate embodiment, processing logic determines whether an external event occurred by sending a request to a process running the virtual machine on the host computing system asking whether an external event occurred. If processing logic determines that an external event occurred, the method 300 returns to block 305 to obtain the updated device information for the virtual machine and provide the device information to a management computing system. If processing logic determines that an external event did not occur, the method 300 ends.

In some embodiments, the method 300 is performed for each virtual machine on each host computing system managed by a management computing system.

Figure 4:
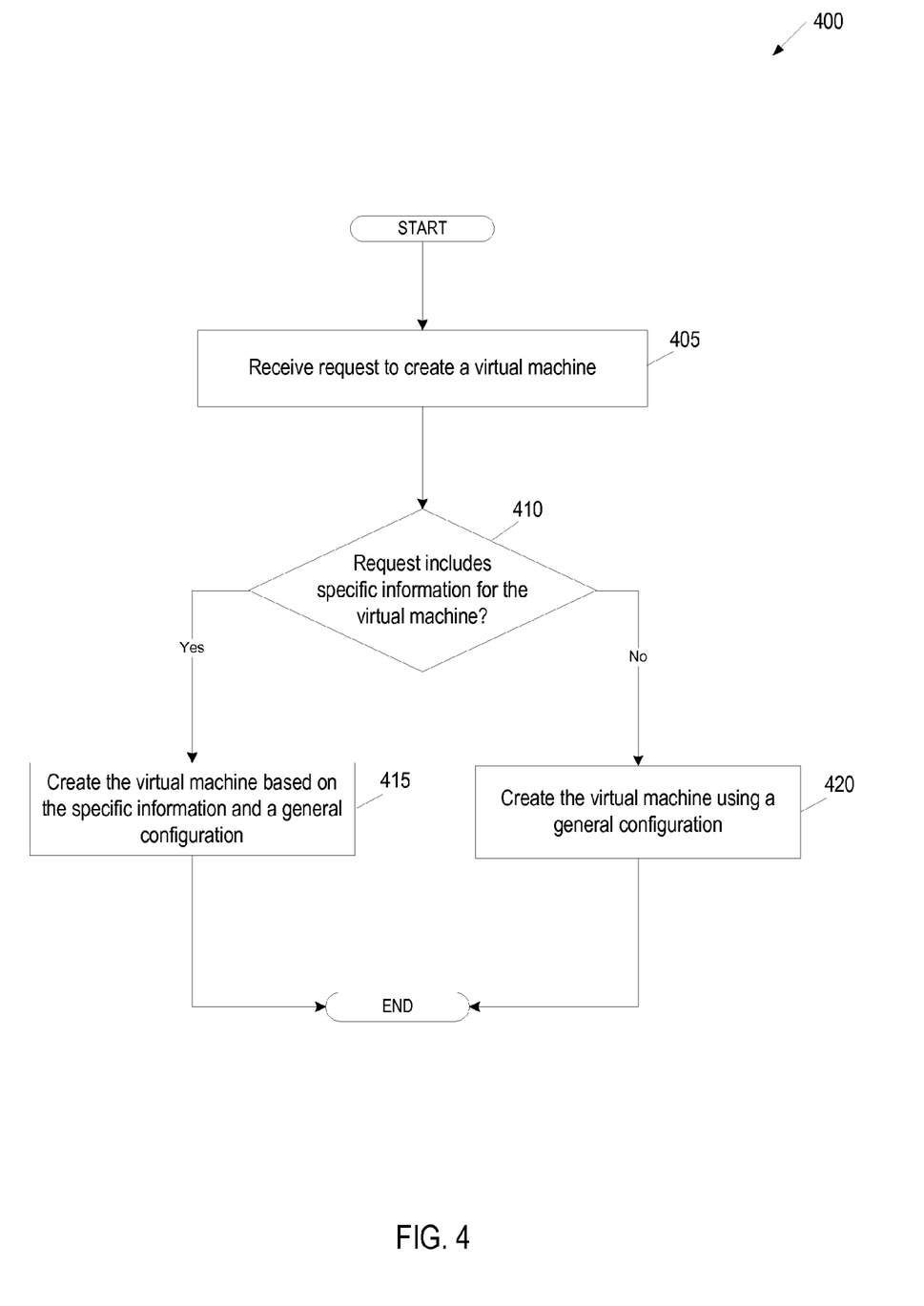
FIG. 4 is a flow diagram illustrating an embodiment for a method of recreating a virtual machine, in accordance with an embodiment.

FIG. 4 is a flow diagram of an embodiment of a method 400 for recreating a virtual machine. The method 400 is performed by processing logic that may comprise hardware (circuitry, dedicated logic, etc.), software (such as is run on a general purpose computer system or a dedicated machine), or a combination of both. In one embodiment, the method 400 is performed by the device discovery module 200 of FIG. 2.

At block 405, processing logic receives a request to add or create a virtual machine. In one embodiment, the request to add or create a virtual machine is received in response to the virtual machine going down and needing to be rebooted or recreated. The request can include an identifier for the virtual machine, such as the name of the virtual machine, a serial number of the virtual machine, etc. In one embodiment, the request to add or create the virtual machine is received by a host computing system from a management computing system.

At block 410, processing logic determines whether the request to add or create the virtual machine includes specific information for the virtual machine. The specific information can include identifiers (e.g., name, address, serial number, etc.) of one or more specific devices to use when creating the virtual machine. In one embodiment, processing logic determines whether the request to add or create the virtual machine includes specific information by accessing the request and parsing the request to determine if specific information is included. In an alternate embodiment, processing logic determines whether the request to add or create the virtual machine includes specific information by searching the request for a specific format, such as an address format (e.g., 0x000), a serial number format (e.g., 1234), etc. If processing logic determines that the request to add or create the virtual machine does not include specific information, the method 400 continues to block 420. If processing logic determines that the request to add or create the virtual machine does include specific information, the method 400 continues to block 415.

At block 415, processing logic adds or creates the virtual machine based on the specific information and a general configuration. The general configuration can include a device or a group of devices to be associated with the virtual machine, such as a disk, a network card, a network controller, etc. The general configuration may not include a specific device or group of devices to use. For example, the general configuration includes that virtual machine A should use a network card, but will not specify which network card virtual machine A should use. In one embodiment, the general configuration is included in the request. In an alternate embodiment, the general configuration is available from the host computing system on which the virtual machine is being added or created, such as in a memory or other storage.

Processing logic can add or create the virtual machine based on the specific information and the general configuration by determining each device to be associated with the virtual machine from the general configuration, determining if a specific device is included in the specific information for each device, selecting an available device of a host computing system on which the virtual machine is being added or created based upon the determination, and associating the virtual machine with the corresponding device or group of devices.

Processing logic can determine each device to be associated with the virtual machine from the general configuration by accessing the device or set of devices included in the general configuration. Processing logic can determine if a specific device is included in the specific information for each device by comparing the device in the general configuration with the device or devices in the specific information. If the device in the general configuration matches a device in the specific information, processing logic can determine that a specific device is included in the specific information for the device in the general configuration. For example, if the general configuration includes a disk and the specific information includes disk A, a specific device (disk A) is included in the specific information for the device (disk) in the general configuration. In another example, if the general configuration includes a network device and the specific information for a network device is a software network bridge, the software network bridge is included in the specific information for the network device in the general configuration.

Upon determining that a specific device is not included in the specific information for a device in the general configuration, processing logic can select an available device of a host computing system on which the virtual machine is being added or created and associate the virtual machine with the corresponding device or group of devices. For example, if the general configuration includes a network card and a disk, the specific information includes a network controller C, and the host computing system has a network card A and a disk B, the virtual machine will be added or created and associated with network card A and disk B.

Upon determining that a specific device is included in the specific information for a device in the general configuration, processing logic can determine whether the specific device is still available to the virtual machine (e.g., exists on the host computing system). If processing logic determines that the specific device is available to the virtual machine, processing logic can select the specific device and associate the specific device with the virtual machine. For example, if the general configuration includes a network card and a disk, and the specific information includes network card A with address 123, a network controller B, and the host computing system has a disk B, the virtual machine will be added or created and associated with network card A with address 123 (from the specific information), network controller B (from the specific information), and disk B. Therefore, an application that previously ran on the virtual machine and used network card A of the virtual machine can continue to use network card A on the recreated virtual machine. If processing logic determines that the specific device is not available to the virtual machine (such as the device being unplugged), processing logic can select an alternate available device of a host computing system on which the virtual machine is being added or created and associate the virtual machine with the available device. For example, if the general configuration includes a network card and a disk, and the specific information includes a network card A and the host computing system has a network card B available to it, the virtual machine will be added or created and associated with network card B because network card A is no longer available to the host computing system.

At block 420, processing logic adds or creates the virtual machine using the general configuration. Processing logic can add or create the virtual machine using a general configuration by determining the device or group of devices to be associated with the virtual machine, selecting an available device of a host computing system on which the virtual machine is being added or created, and associating the virtual machine with the corresponding device or group of devices. For example, if the general configuration includes a network card and a disk, and the host computing system has a network card A and a disk B, the virtual machine will be added or created and associated with network card A and disk B.

Figure 5:
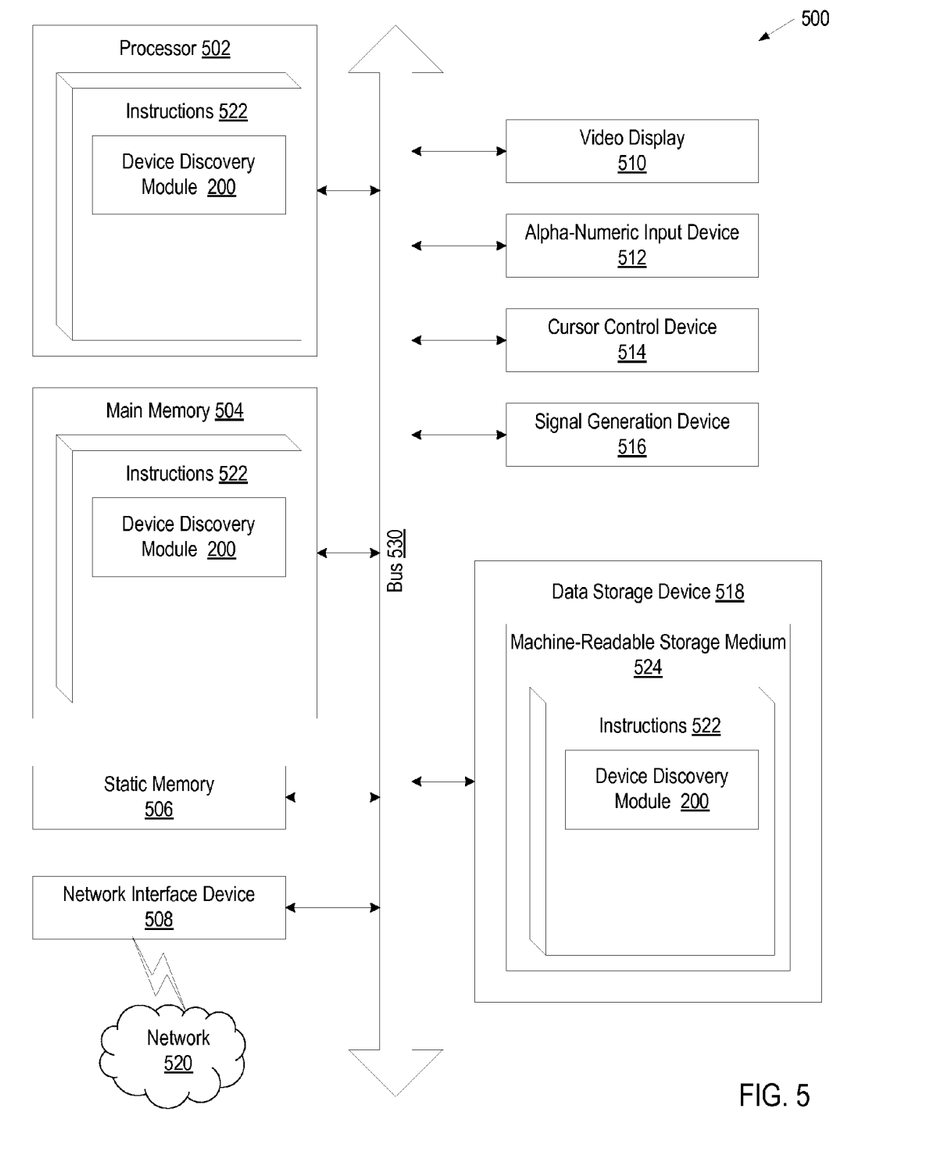
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 524 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a device discovery module 200, and/or a software library containing methods that automatically discover externally added devices. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating," "creating," "determining," "computing," "identifying," "modifying," "triggering," "injecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    obtaining, by processing device of a host computing system, initial device information for a virtual machine running on the host computing system, wherein the initial device information comprises information of an external device that is external to the processing device, the host computing system, and the virtual machine;
    determining, by the processing device, whether an external event occurred on the virtual machine running on the host computing system, wherein a management computing system associated with the host computing system does not receive a notification of the external event, wherein the external event comprises at least one of the external device being hot-added to at least one of the host computing system or the virtual machine or the external device being hot-removed from at least one of the host computing system or the virtual machine; and
    upon determining that the external event occurred on the virtual machine running on the host computing system, obtaining, by the processing device, updated device information for the virtual machine running on the host computing system.

2. The method of claim 1, further comprising:
    determining, by the processing device, whether a report should be generated for the virtual machine; and
    upon determining that a report should be generated for the virtual machine, generating a report for the virtual machine to be provided to the management computing system, wherein the report comprises at least a portion of device information for the virtual machine, wherein the device information comprises at least one of the initial device information or the updated device information.

3. The method of claim 1, wherein device information comprises an address of the external device associated with the virtual machine running on the host computing system, wherein the device information comprises at least on of the initial device information or the updated device information.

4. The method of claim 1, further comprising:
    receiving, by the processing device, a request to recreate the virtual machine;
    determining, by the processing device, whether the request to recreate the virtual machine comprises specific information for the virtual machine;
    upon determining that the request to recreate the virtual machine comprises specific information, creating, by the processing device, the virtual machine in view of the specific information; and
    upon determining that the request to recreate the virtual machine does not comprise specific information, creating, by the processing device, the virtual machine in view of a general configuration.

5. The method of claim 4, wherein creating the virtual machine in view of the specific information comprises:
    for each requested device in the general configuration:
        determining whether the specific information comprises a specific device for the requested device;
        upon determining that the specific information does not comprise a specific device for the requested device, selecting an available device for the requested device;

upon determining that the specific information comprises a specific device for the requested device, determining whether the specific device is available to the virtual machine;

upon determining that the specific device is available to the virtual machine, selecting the specific device to be associated with the virtual machine; and upon determining that the specific device is not available to the virtual machine, selecting a device other than the specific device to be associated with the virtual machine, wherein the external device comprises at least one of the requested device, the available device, the specific device, or the device other than the specific device.

6. The method of claim 5, wherein the specific information comprises an address for the specific device to be associated with the virtual machine.

7. A non-transitory computer readable storage medium having instructions that, when executed by a processing device, cause the processing device to:

obtaining, by the processing device, initial device information for a virtual machine running on a host computing system, wherein the initial device information comprises information of an external device that is external to the processing device, the host computing system, and the virtual machine;

determine, by the processing device, whether an external event occurred on the virtual machine running on the host computing system, wherein a management computing system associated with the host computing system does not receive a notification of the external event, wherein the external event comprises at least one of the external device being hot-added to at least one of the host computing system or the virtual machine or the external device being hot-removed from at least one of the host computing system or the virtual machine; and upon determining that the external event occurred on the host computing system, obtain, by the processing device, updated device information for the virtual machine running on the host computing system.

8. The non-transitory computer readable storage medium of claim 7, having instructions that, when executed by a processing device, cause the processing device to further:

determine whether a report should be generated for the virtual machine; and upon determining that a report should be generated for the virtual machine, generate a report for the virtual machine to be provided to the management computing system, wherein the report comprises at least a portion of device information for the virtual machine, wherein the device information comprises at least on of the initial device information or the updated device information.

9. The non-transitory computer readable storage medium of claim 7, wherein device information comprises an address of the external device associated with the virtual machine running on the host computing system, wherein the device information comprises at least on of the initial device information or the updated device information.

10. The non-transitory computer readable storage medium of claim 7, having instructions that, when executed by a processing device, cause the processing device to further:

receive a request to recreate the virtual machine;

determine whether the request to recreate the virtual machine comprises specific information for the virtual machine;

upon determining that the request to recreate the virtual machine comprises specific information, create the virtual machine in view of the specific information; and upon determine that the request to recreate the virtual machine does not comprise specific information, create the virtual machine in view of a general configuration.

11. The non-transitory computer readable storage medium of claim 10, creating the virtual machine in view of the specific information comprises:

for each requested device in the general configuration:

determining whether the specific information comprises a specific device for the requested device;

upon determining that the specific information does not comprise a specific device for the requested device, selecting an available device for the requested device;

upon determining that the specific information comprises a specific device for the requested device, determining whether the specific device is available to the virtual machine;

upon determining that the specific device is available to the virtual machine, selecting the specific device to be associated with the virtual machine; and upon determining that the specific device is not available to the virtual machine, selecting a device other than the specific device to be associated with the virtual machine, wherein the external device comprises at least one of the requested device, the available device, the specific device, or the device other than the specific device.

12. The non-transitory computer readable storage medium of claim 11, wherein the specific information comprises an address for the specific device to be associated with the virtual machine.

13. A computing device comprising:

a memory; and a processing device operatively coupled to the memory, wherein the processing device is to:

obtain initial device information for a virtual machine running on a host computing system, wherein the initial device information comprises information of an external device that is external to the processing device, the host computing system, and the virtual machine;

determine whether an external event occurred on the virtual machine running on the host computing system, wherein a management computing system associated with the host computing system does not receive a notification of the external event, wherein the external event comprises at least one of the external device being hot-added to at least one of the host computing system or the virtual machine or the external device being hot-removed from at least one of the host computing system or the virtual machine; and upon determining that the external event occurred on the host computing system, obtain updated device information for the virtual machine running on the host computing system.

14. The computing device of claim 13, wherein the processing device is further to:

determine whether a report should be generated for the virtual machine; and upon determining that a report should be generated for the virtual machine, generate a report for the virtual machine to be provided to the management computing system, wherein the report comprises at least a portion of device information for the virtual machine, wherein the device information comprises at least one of the initial device information or the updated device information.

15. The computing device of claim 13, device information comprises an address of the external device associated with the virtual machine running on the host computing system, wherein the device information comprises at least one of the initial device information or the updated device information.

16. The computing device of claim 13, wherein the processing device is further to:
 receive a request to recreate the virtual machine;
 determine whether the request to recreate the virtual machine comprises specific information for the virtual machine;
 upon determining that the request to recreate the virtual machine comprises specific information, create the virtual machine in view of the specific information; and
 upon determining that the request to recreate the virtual machine does not comprise specific information, create the virtual machine in view of a general configuration.

17. The computing device of claim 16, wherein to create the virtual machine in view of the specific information, the processing device is further to:
 for each requested device in the general configuration:
  determine whether the specific information comprises a specific device for the requested device;
  upon determining that the specific information does not comprise a specific device for the requested device, select an available device for the requested device;
  upon determining that the specific information comprises a specific device for the requested device, determine whether the specific device is available to the virtual machine;
  upon determining that the specific device is available to the virtual machine, select the specific device to be associated with the virtual machine; and
  upon determining that the specific device is not available to the virtual machine, select a device other than the specific device to be associated with the virtual machine, wherein the external device comprises at least one of the requested device, the available device, the specific device, or the device other than the specific device.

18. The computing device of claim 17, wherein the specific information comprises an address for the specific device to be associated with the virtual machine.

* * * * *